A. CAMPBELL.
FRAMELESS GATE.
APPLICATION FILED FEB. 19, 1912.
1,027,237.
Patented May 21, 1912.
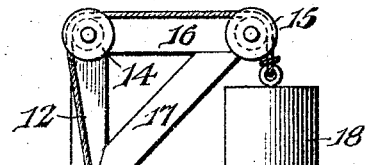
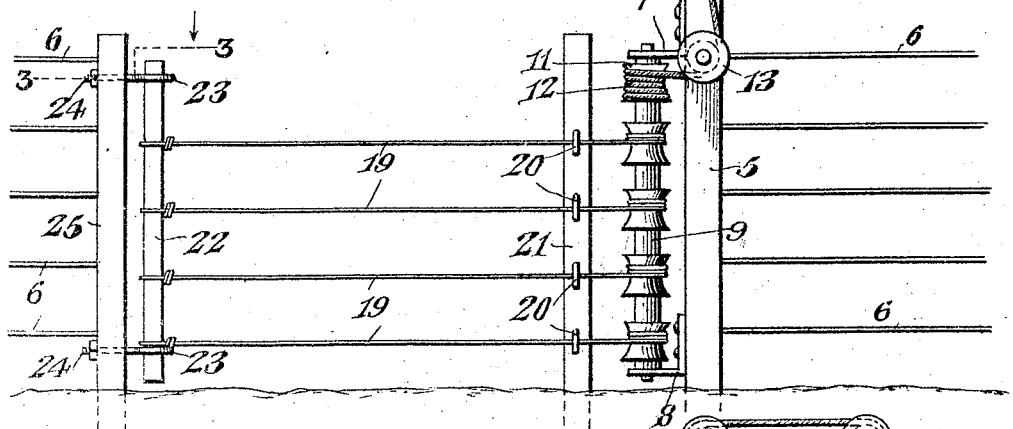
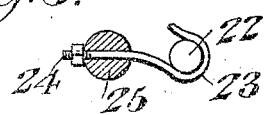
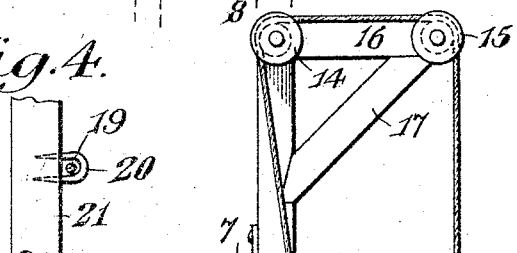
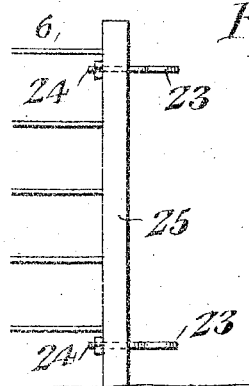
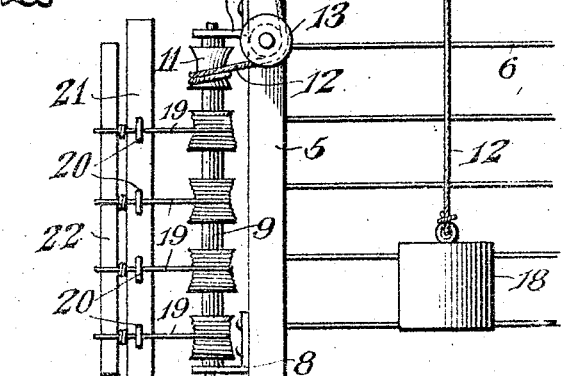
Allan Campbell, INVENTOR
WITNESSES
BY
ATTORNEY

UNITED STATES PATENT OFFICE.

ALLAN CAMPBELL, OF BRANDON, MANITOBA, CANADA.

FRAMELESS GATE.

1,027,237.

Specification of Letters Patent.

Patented May 21, 1912.

Application filed February 19, 1912. Serial No. 678,467.

*To all whom it may concern:*

Be it known that I, ALLAN CAMPBELL, a subject of the King of Great Britain, residing at Brandon, in the county of Brandon, Province of Manitoba, Dominion of Canada, have invented a new and useful Frameless Gate, of which the following is a specification.

My invention relates to improvements in what are known as frameless gates, and has for its object to provide a simply constructed gate that is opened and closed along a straight line across the passage between two spaced posts, and is furnished with simple mechanism that will be placed in an operative position when the gate is closed and when the gate is released will operate to close the same. Further, my gate is cheap to manufacture and will prove reliable in operation, and as it does not operate on the swinging principle, will obviate the many disadvantages incident to swinging gates, such as sagging at their free ends and contacting with various obstructions in the path of the swing of the gate.

Other objects and advantages of my invention will appear in the course of the following specification.

While the accompanying drawings represent what I consider the preferred embodiment of my invention, yet I reserve the right to make any and all such changes in the construction, proportions and arrangement of the parts of my gate and the operating mechanism thereof as the scope of the appended claims will permit.

In the accompanying drawings: Figure 1 is a front elevation of my improved gate showing the same in a closed position. Fig. 2 is a view similar to Fig. 1 but showing the gate in an open position. Fig. 3 is a top plan detail view, enlarged, on the line 3—3 Fig. 1 showing one of the gate fastenings or hooks and the manner of securing it to a gate post. Fig. 4 is a side elevation, detail view, enlarged, showing one of the guiding-eyes or staples which are secured to the intermediate post.

Referring to the drawings by numerals, 5 designates the main gate post, which, as shown, extends some distance above the top of the fence 6. To one side of the gate post 5 are connected the ends of the longitudinally-extending, parallel wires constituting the fence 6. Right angular brackets 7 and 8 each have one arm respectively secured to the gate post at the side opposite to where the wires of the fence 6 are connected, while the other arm extends horizontally therefrom. The horizontal arms are each provided with circular apertures which are in vertical alinement. A vertically-disposed roller shaft 9 fits between the horizontal arms and is journaled therein by means of suitable gudgeons, which turn in the apertures of said brackets. Fixed upon the roller shaft 9 and spaced apart thereon are a plurality of cylindrical spools, and, while I have shown five spools, this is purely an arbitrary number as I could employ any number found most desirable.

Secured centrally to the upper spool 11 is a rope 12, which passes under a pulley 13 mounted on the front side of the gate post 5 at a point substantially in line with the top of the upper spool 11. At the top of the front side of the gate post 5 is mounted a second pulley 14, and, as illustrated the rope 12 passes from the spool 11 under and up from the pulley 13 to the opposite side of and over the pulley 14 from which point the rope continues over a pulley 15 mounted at the end of a horizontally-extending arm 16, which is secured at the top of the gate post 5, and suitably braced underneath by a diagonally-disposed brace 17. Attached to the end of the cord is a weight 18 for a purpose to be hereinafter explained.

Connected to the center of each of the spools 11, below the top one to which the cord 12 is connected, are wires 19 which are adapted to wind and unwind upon their respective spools. Each wire passes through a horizontally alined guide-eye or staple 20 secured to the front face of a vertical post 21, which serves as a stop or abutment. The wires 19 after passing through the guide-eyes 20 are secured to a vertically-disposed standard 22 at such points as to maintain the wires in substantial parallelism. The standard 22, as shown in Fig. 1, when the gate is closed, is engaged by the hooks 23, the shanks 24 of which are suitably secured to a second gate post 25, which as shown, also has the wires of another portion of the fence 6 connected to it. In order to prevent accidental disengagement of the standard from the hooks 23, the openings in the hooks are oppositely-disposed with respect to the roller 9.

As shown in Fig. 1, since the rope 12 is wound on the upper spool 11 in the opposite direction in which the wires 19 are wound on the lower spools 11 when the gate is in a closed position, the wires are unwound from the lower spools while the cord 12 is wound upon the upper spool and the weight 18 raised. When it is desired to open the gate it is simply necessary to release the standard 22 from the hooks 23, when the weight will immediately begin to descend unwinding the rope from the upper shaft 9 to the right and winding the wires upon their respective spools until the standard 22 contacts with post 21, when the rotation of the roller will be stopped and the descent of the weight checked, as illustrated in Fig. 2. To close the gate all that it is necessary to do is to reëngage the front standard 22 with the hooks 23, which will unwind the wires 19 from their respective spools 11 and turn the roller shaft 9 to the left thereby rewinding the cord 12 upon the upper spool 11 and raising the weight 18, when the gate and its operating mechanism will reassume the position shown in Fig. 1 and be ready to instantly open when the standard 22 is disengaged from the hooks 23.

From the foregoing it will be apparent that the wires 19 and the standard 22 constitute the gate or barrier proper. The guide-eyes 20 are positioned horizontally in line with the central portions of their opposite or respective spools 11 whereby the guide-eyes serve to insure that when the gate is being closed the wires 19 are fed so that they wind on the reduced portions of the spools, and that when the gate is being opened, the wires are unwound from the spools so as to prevent them from becoming displaced or tangled.

What I claim is:—

1. In a gate of the class described, the combination with the gate posts spaced apart to provide a passage between them, a vertically disposed roller shaft mounted contiguous to one of said gate posts, a plurality of spools mounted on said roller shaft, a series of wires individually connected to each of said spools, retaining means carried by the other gate post, a vertical standard connecting the free ends of the wires, an intermediate post carrying separate guides for the wires, and means for rotating said roller shaft to cause said spools to wind said wires thereon to open the passage between said gate posts.

2. In a gate of the class described, the combination with the gate posts spaced apart to provide a passage between them, of a roller shaft mounted to rotate in supports carried by one of the said gate posts, a plurality of spools mounted on said roller shaft, a series of wires connected to said spools and normally extending across the passage to the other gate post, a standard to which the free ends of said wires are connected, rigid hooks carried by the second-mentioned gate post, said standard being positioned in said hooks when said gate is in a closed position, an intermediate post spaced from the roller shaft and having guides for the wires at spaced points thereon, and means for placing said roller shaft under tension whereby said standard will be firmly held against accidental release, but when said standard is released from said hooks, said roller shaft will revolve to wind said wires upon said spools to open the passage between said gate posts.

3. In a gate of the class described, the combination with the gate posts spaced apart to provide a passage between them, of a vertically-disposed roller shaft mounted to rotate in brackets carried by one of said gate posts, a plurality of spools rigidly mounted on said roller shaft and spaced apart thereon, a series of wires individually connected to all but the top one of said spools and normally extending across the passage to the other gate post, an intermediate post spaced from the roller shaft and provided with a series of individual guides for the wires leading from the spools, a standard connecting the free ends of the wires, hooks attached to the other gate post and arranged in a horizontal position and adapted to engage with the opposite ends of the standard, a pulley mounted on the first-mentioned gate post contiguous to the upper spool, spaced pulleys mounted upon an extension of the said gate post, and a rope connected to the upper spool and wound around the several pulleys and carrying a weight at its end, whereby the roller shaft with its several spools will be placed under tension and the wires kept taut, and when said standard is released from said hooks, said roller shaft will revolve to wind said wires upon said spools to open the passage between said gate posts.

In testimony, that I claim the foregoing as my own, I have hereto affixed my signature in the presence of two witnesses.

ALLAN CAMPBELL.

Witnesses:
 JOHN SIEFFERT,
 JAMES SPENCE.